(12) United States Patent
Giles et al.

(10) Patent No.: US 8,499,946 B2
(45) Date of Patent: Aug. 6, 2013

(54) EXPANDABLE PREFORMED LINERS

(75) Inventors: Gavin Giles, Dover, DE (US); David Conant, Camden, DE (US)

(73) Assignee: Playtex Products, Inc., Shelton, CT (US)

( * ) Notice: Subject to any disclaimer, the term of this patent is extended or adjusted under 35 U.S.C. 154(b) by 881 days.

(21) Appl. No.: 11/639,761

(22) Filed: Dec. 15, 2006

(65) Prior Publication Data

US 2008/0142467 A1 Jun. 19, 2008

(51) Int. Cl.
*F25D 3/08* (2006.01)

(52) U.S. Cl.
USPC .......... 215/11.3; 215/11.1; 215/11; 215/11.5; 215/11.6; 215/383; 220/495.02; 220/495.04; 220/495.06; 220/671; 220/675; 221/33; 221/105; 221/131; 221/153.13

(58) Field of Classification Search
USPC .................. 215/11.1, 11.3, 11.6; 220/495.06, 220/495.04; 222/105, 209, 100, 214, 211
See application file for complete search history.

(56) References Cited

U.S. PATENT DOCUMENTS

| | | | |
|---|---|---|---|
| 985,328 A * | 2/1911 | Decker | 215/11.6 |
| 2,624,485 A | 1/1953 | Boston | |
| 2,697,531 A | 12/1954 | Hood | |
| 2,793,778 A | 5/1957 | Bruce | |
| 2,803,365 A | 8/1957 | Allen | |
| 2,939,598 A | 6/1960 | Donleavy | |
| 3,163,544 A | 12/1964 | Valyi | |
| 3,215,307 A * | 11/1965 | Connell | 220/495.01 |
| 3,362,555 A | 1/1968 | Hurtado | |
| 3,436,007 A * | 4/1969 | Rausing | 220/62.22 |
| 3,487,989 A * | 1/1970 | Ignell et al. | 220/495.08 |
| 3,645,414 A | 2/1972 | Barr | |
| 3,776,408 A * | 12/1973 | Wald | 215/11.3 |
| 3,777,925 A | 12/1973 | Eckholm | |
| 3,784,039 A * | 1/1974 | Marco | 215/11.3 |
| 3,790,017 A * | 2/1974 | Fitzpatrick et al. | 215/11.3 |
| 3,834,570 A | 9/1974 | Barr | |
| 3,851,781 A * | 12/1974 | Marco | 215/11.3 |
| 3,871,542 A * | 3/1975 | Hammer | 215/11.3 |
| 4,657,151 A | 4/1987 | Cabernoch | |

(Continued)

FOREIGN PATENT DOCUMENTS

| | | |
|---|---|---|
| CA | 1006450 | 3/1977 |
| CN | 1568283 | 1/2005 |

(Continued)

OTHER PUBLICATIONS

International Search Report dated Oct. 1, 2008 for PCT Application No. PCT/US07/25658.

(Continued)

*Primary Examiner* — Anthony Stashick
*Assistant Examiner* — Cynthia Collado
(74) *Attorney, Agent, or Firm* — Ohlandt, Greeley, Ruggiero & Perle, L.L.P.

(57) ABSTRACT

A preformed liner that expands when filled is provided. In one embodiment, the preformed liner includes a central section having a plurality of flutes that allow the liner to expand. In other embodiments, the preformed liner includes at least a central section that is made of an expandable or stretchable elastomeric material. In still other embodiments, the preformed liner includes a central section having a plurality of flutes and is made of an expandable or stretchable elastomeric material.

30 Claims, 8 Drawing Sheets

U.S. PATENT DOCUMENTS

| | | | |
|---|---|---|---|
| 4,678,093 | A | 7/1987 | Allen |
| 4,714,191 | A | 12/1987 | Richardson |
| 4,759,453 | A | 7/1988 | Paetzold |
| 4,815,615 | A | 3/1989 | Phlaphongphanich |
| 4,869,912 | A | 9/1989 | McCoy et al. |
| 4,895,264 | A * | 1/1990 | Phlaphongphanich ...... 215/11.1 |
| 5,005,733 | A | 4/1991 | Stoody |
| 5,069,351 | A | 12/1991 | Gunderson et al. |
| 5,588,548 | A | 12/1996 | Brankley |
| 5,687,861 | A * | 11/1997 | Wiedemann ................ 215/11.3 |
| 5,699,920 | A * | 12/1997 | Ida et al. .................... 215/11.3 |
| 5,709,168 | A | 1/1998 | Walker |
| 5,747,083 | A | 5/1998 | Raymond et al. |
| 5,806,711 | A * | 9/1998 | Morano et al. ................ 221/33 |
| 5,921,426 | A * | 7/1999 | Randolph ................ 220/495.06 |
| 6,042,850 | A * | 3/2000 | Ida et al. ........................ 426/2 |
| 6,123,222 | A | 9/2000 | Richiger et al. |
| 6,248,096 | B1 | 6/2001 | Dwork et al. |
| 6,365,202 | B1 * | 4/2002 | Ida et al. ........................ 426/2 |
| 6,576,278 | B1 | 6/2003 | Sprehe |
| 6,616,000 | B1 * | 9/2003 | Renz ........................... 215/11.1 |
| 6,737,091 | B1 | 5/2004 | Littell |
| 6,761,286 | B2 | 7/2004 | Py et al. |
| 6,820,824 | B1 * | 11/2004 | Joseph et al. ................ 239/346 |
| 6,884,229 | B2 * | 4/2005 | Renz .............................. 604/74 |
| 6,899,239 | B1 * | 5/2005 | Gray ........................... 215/11.3 |
| 6,910,594 | B2 | 6/2005 | Foley |
| 6,920,991 | B2 | 7/2005 | Holley |
| 6,923,332 | B1 | 8/2005 | Thomas |
| 7,000,806 | B2 | 2/2006 | Py et al. |
| 2003/0118701 | A1 | 6/2003 | Sprehe |
| 2004/0188371 | A1 * | 9/2004 | Holley, Jr. .................... 215/11.1 |
| 2005/0129338 | A1 | 6/2005 | Sprehe |
| 2005/0194342 | A1 | 9/2005 | Nhan et al. |
| 2006/0011497 | A1 | 1/2006 | Segovia et al. |
| 2006/0078656 | A1 | 4/2006 | Manning et al. |

FOREIGN PATENT DOCUMENTS

| | | |
|---|---|---|
| GB | 2109247 | 6/1983 |
| GB | 2181062 | 4/1987 |
| JP | 58118223 | 7/1983 |
| JP | 10-155878 | 6/2008 |
| WO | 03/088895 | 10/2003 |

OTHER PUBLICATIONS

Written Opinion dated Oct. 1, 2008 for PCT Application No. PCT/US07/25658.

International Preliminary Report on Patentability dated Aug. 4, 2011 from PCT Application No. PCT/US07/25658.

Notice of Reasons for Rejection dated Jan. 6, 2012 from corresponding Japanese Application No. 2009-541402.

Office Action dated Mar. 13, 2012 from corresponding Canadian Application No. 2,672,753.

Decision of Rejection Dated July 24, 2012 From Corresponding Japanese Application No. 2009-541402.

The First Office Action Dated May 31, 2012 From Corresponding Chinese Application No. 200780049951.6.

The Second Office Action Dated February 16, 2013 From Corresponding Chinese Application No. 200780049951.6.

* cited by examiner

EXPANDABLE PREFORMED LINERS

BACKGROUND OF THE INVENTION

1. Field of the Invention

The present disclosure relates to bottle assemblies having preformed bottle liners. More particularly, the present disclosure relates to expandable preformed liners.

2. Description of Related Art

Reusable baby bottles or hard bottles, such as those made of glass or plastic, have been commonly used to feed babies milk, formula, water, and other liquids. After the liquid is placed in the bottle, a nipple is attached to the bottle and the assembly is ready for use. The hard bottle is typically cleaned and sterilized between each use, requiring substantial time and effort. Another limitation inherent in hard bottles is the tendency of babies to ingest substantial amounts of air when ingesting the liquid. This air can cause uncomfortable distention and gas in the baby's stomach, and may lead to vomiting and other problems.

More recently, an alternative to the hard bottle in the form of a disposable bottle liner has been proposed. The liner is used in conjunction with a holder that supports the bag. The liner, which is used only once, is pre-sterilized, and is inserted into the holder. The liner is then filled with liquid, and a nipple is attached to the holder. This alternative is economical and sanitary, and greatly minimizes the time and effort required to prepare for feeding a baby. Further, the liners collapse as liquid is drawn out, thus minimizing the amount of air the baby ingests.

Disposable bottle liners typically take one of two forms. One type of disposable bottle liner is formed in the shape of a flat bag or sac. The flat bag or sac type liner is installed over the rim of the holder and, once filled, expands out against the holder. Thus, such flat bag or sac type liners provide a filled volume that is substantially equal to the internal volume of the holder. Unfortunately, it can be difficult to install the flat bag or sac type liners on the rim of the holder. Further, the liner, once installed on the rim of the holder, can often slip off the rim while filling of the liner, resulting in a spill.

Another particular type of disposable bottle liner that has recently become popular is known as a preformed liner. Such preformed liners are preformed from a semi-rigid polymer in a generally cylindrical shape and, thus, are easily installed by dropping the liner into the holder. Unfortunately, prior art preformed liners can only provide a filled volume that is equal to that of the internal volume of the liner and not the holder. As a result, the volume can only be increased by increasing the overall size of both the liner and the holder. However, increasing the size is impracticable, since the larger size may become difficult for a child to use. Additionally, increasing the size would result in higher manufacturing costs.

Accordingly, there is a need for preformed bottle liners that overcome, alleviate, and/or mitigate one or more of the aforementioned and other deleterious effects of prior art liners.

BRIEF SUMMARY OF THE INVENTION

Advantageously, the present disclosure provides a preformed liner that is capable of expansion when filled, thereby providing increased volume without modifying the volume and/or size of the liner holder.

Advantageously, the present disclosure also provides a preformed liner that expands when filled so that the filled volume of the liner is substantially equal to the internal volume of the liner holder. In one embodiment, the preformed liner includes a central section having a plurality of flutes that allow the liner to expand. In other embodiments, the preformed liner includes at least a central section that is made of an expandable or stretchable elastomeric material. In still other embodiments, the preformed liner includes a central section having a plurality of flutes and is made of an expandable or stretchable elastomeric material.

A preformed liner having a neck section, a central section, and a base section is provided. The neck section has an open top end and the base section has a closed bottom end. The central section depends from the neck section along a longitudinal axis. The base section depends from the central section along the longitudinal axis. The central section expands radially from the longitudinal axis and collapse radially inward toward the longitudinal axis.

A preformed liner is also provided that includes a neck section, a central section, and a base section, where the central section has flutes separated divider walls. The neck section has an open top end and the base section has a closed bottom end. The central section depends from the neck section along a longitudinal axis. The base section depends from the central section along the longitudinal axis. The flutes expand radially from the longitudinal axis and collapse radially inward toward the longitudinal axis.

A bottle assembly is provided that includes a holder having an open top, a preformed liner, and a retaining rim. The preformed liner has a rim and a central section. The liner is disposed in the holder so that the rim rests on the open top. The central section of the liner moves between a normal position and an expanded position with respect to a longitudinal axis of the liner. The retaining rim removably secures a nipple and the rim, in an airtight manner, to the holder over the open top.

A preformed liner kit is provided that includes a plurality of preformed liners, each preformed liner has a neck section and a central section. The neck section has an open top and a rim extending therefrom. The central section moves between a normal position and an expanded position with respect to a longitudinal axis. The plurality of preformed liners are nested, one inside the other, so that the divider walls are radially offset from one another to form a stack. A package or wrapper is disposed around the stack.

A method of assembling a baby bottle is also provided. The method includes inserting a preformed liner into an open end of a holder until a rim of the preformed liner rests on the open end and filling the preformed liner with liquid until the preformed liner expands radially outward from the longitudinal axis so as to contact an inside of the holder.

The above-described and other features and advantages of the present disclosure will be appreciated and understood by those skilled in the art from the following detailed description, drawings, and appended claims.

DETAILED DESCRIPTION OF THE INVENTION

Figure 1:
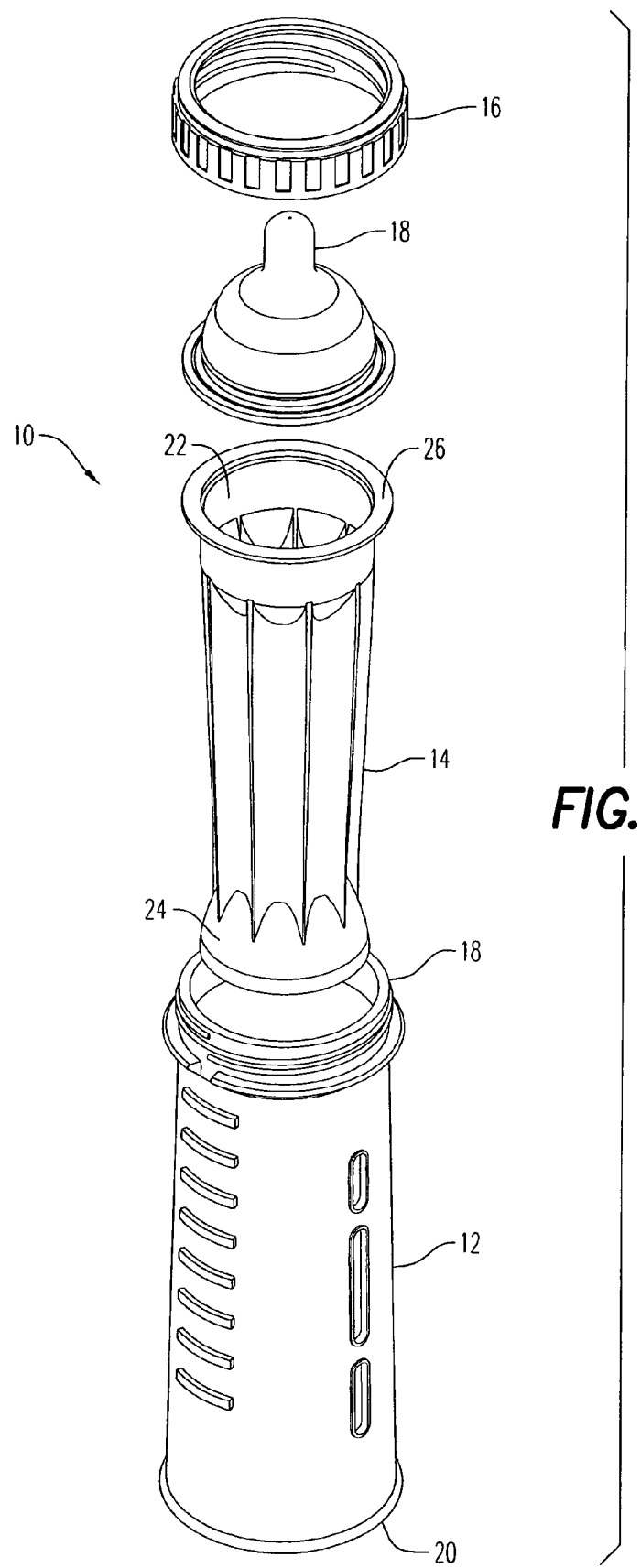
FIG. 1 is an exploded perspective view of an exemplary embodiment of a bottle assembly according to the present disclosure in use with an exemplary embodiment of a fluted preformed liner according to the present disclosure.

Referring to the drawings and in particular to FIG. 1, an exemplary embodiment of a bottle assembly according to the present disclosure is generally represented by reference numeral 10. Bottle assembly 10 includes a holder 12, a preformed liner 14, a retaining rim 16, and a nipple 18. Advantageously, preformed liner 14 can expand, when filled with liquid, so that the filled volume of the preformed liner is substantially equal to the internal volume of the preformed liner holder.

Bottle assembly 10 is assembled in a known manner. For example, holder 12 is a generally cylindrical member having an open top end 18 and an open bottom end 20. Preformed liner 14 includes an open top end 22 and a closed bottom end 24 so that the preformed liner can hold a predetermined volume of liquid. Preformed liner 14 further includes a rim 26 extending radially outward from the preformed liner at its open top end 22. Preformed liner 14 is inserted into open top end 18 of holder 12 until rim 26 rests on open top end 18 of the holder. After the filling of preformed liner 14, bottle assembly 10 can be assembled by securing nipple 18 over open top end 18 of holder 12 in an airtight fashion via retaining rim 16.

Figure 2:
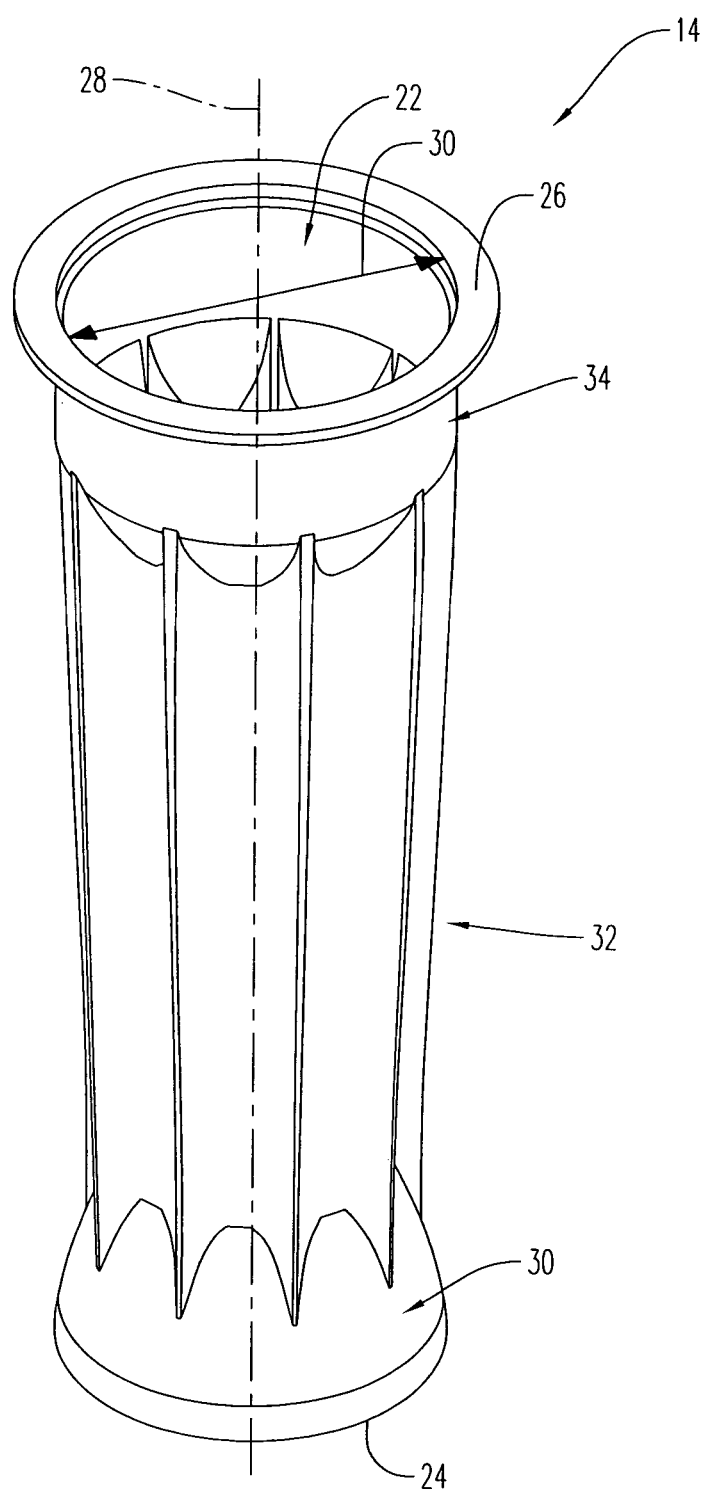
FIG. 2 is a top perspective view the fluted preformed liner of FIG. 1.
Figure 3:
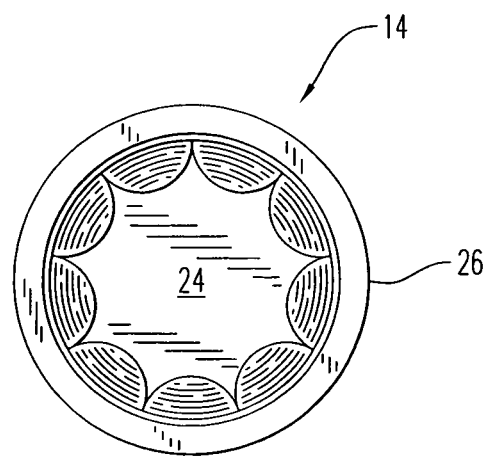
FIG. 3 is a top view of the fluted preformed liner of FIG. 2.
Figure 4:
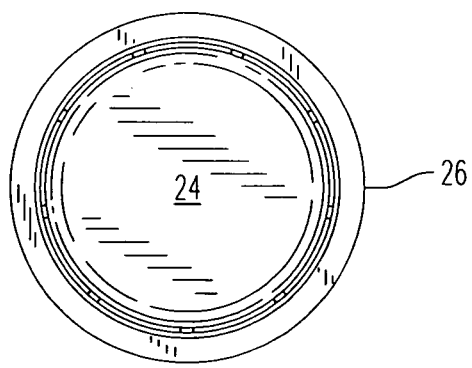
FIG. 4 is a bottom view of the fluted preformed liner of FIG. 2.

An exemplary embodiment of fluted preformed liner 14 according to the present disclosure is described in detail with reference to FIGS. 2 through 4. Preformed liner 14 extends along a longitudinal axis 28 and includes a base section 30, a central section 32, and a neck section 34.

Base section 30 has a generally frusto-conical shape that decreases in diameter from closed bottom end 24 upwards along axis 28 towards central section 32. Thus, the outer surface of base section 30 is angled with respect to axis 28 by between about 15 to about 22 degrees and any subranges therebetween.

Central section 32 and neck section 34 each have a generally cylindrical shape, with the central section preferably having a slight taper. Central section 32 has a first taper that increases in diameter from base section 30 upwards along axis 28 towards neck portion 34. Thus, the outer surface of central section 32 is angled with respect to axis 28 by between about 5 degrees to about 30 degrees, more preferably between about 10 degrees to about 25 degrees, and any subranges therebetween.

Closed bottom end 24 of preformed liner 14 has an outer diameter 36 that is, preferably less than an inner diameter 38 of open top end 22. In this manner, a plurality of preformed liners 14 can be nested or stacked within one another as described herein detail below.

Advantageously, central section 32 includes a plurality of flutes 40 formed along the general direction of the outer surface of preformed liner 14. Each flute 40 is separated from adjoining flutes by a divider wall 42. Since central section 32 is tapered, flutes 40 and divider walls 42 are generally parallel to the first taper of the central section.

In the illustrated embodiment, each flute 40 is a generally vertical groove having a generally semi-circular cross sectional shape. Of course, it is contemplated by the present disclosure for flutes 40 to have any desired cross sectional such as, but not limited to, polygonal, semi-ovoid, and any combinations thereof. Flutes 40 preferably all have the same cross sectional shape and are preferably uniformly distributed about the circumference of central section 32. However, it is also contemplated by the present disclosure for flutes 40 to have the same or different cross sectional shapes and/or for the flutes to be non-uniformly distributed about the circumference of central section 32. Moreover, it is contemplated by the present disclosure for each flute to have a variable cross sectional shape along said longitudinal axis.

Preformed liner 14 can have as many flutes 40 and divider walls 42 as desired. In the illustrated embodiment, preformed liner 14 has nine flutes 40 and nine divider walls 42. Of course, more or less than nine flutes and divider walls are contemplated by the present disclosure. Preferably, preformed liner has between about four and about twelve flutes/walls 40, 42, more preferably between about six and about ten, with about nine being most preferred.

Divider walls 42 provide structural support and reinforcement for preformed liner 14 for improved durability. It is preferred that divider walls 42 are evenly separated apart to provide uniform load distribution and permit the preformed liner to uniformly collapse inward. Therefore, due to the structure and position of divider walls 42, the preformed liner 14 initially collapses radially inward (towards axis 28) and then longitudinally upward (along axis 28). Additionally, flutes 40 provide the preformed liner 14 to expand radially outward (away from axis 28) to increase the internal volume of the preformed liner to substantially equal the internal volume of holder 12.

Figure 5:
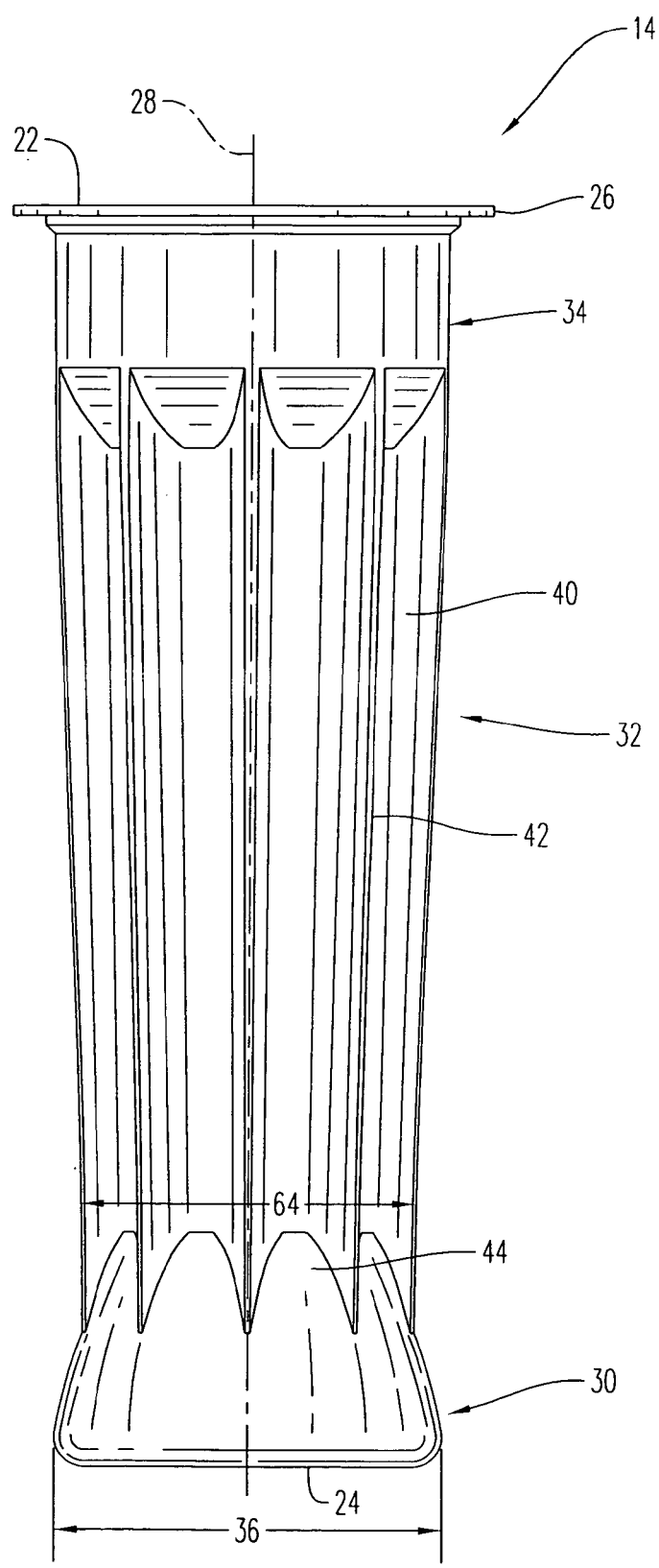
FIG. 5 is a side view of the fluted preformed liner of FIG. 2.
Figure 6:
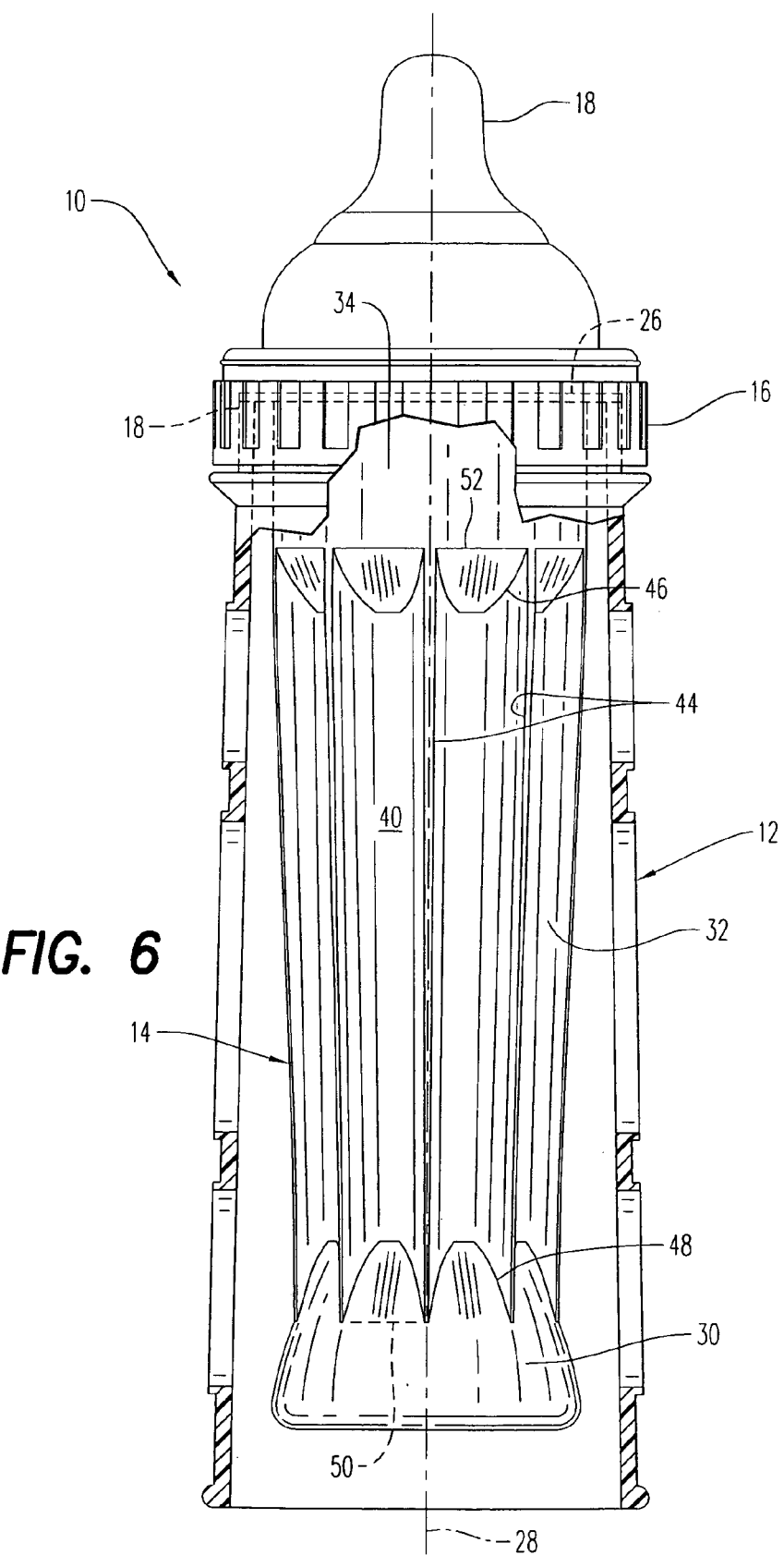
FIG. 6 is a side perspective view of the bottle assembly of FIG. 1, before filling illustrating the fluted preformed liner in a neutral position and showing the holder in cross section.
Figure 7:
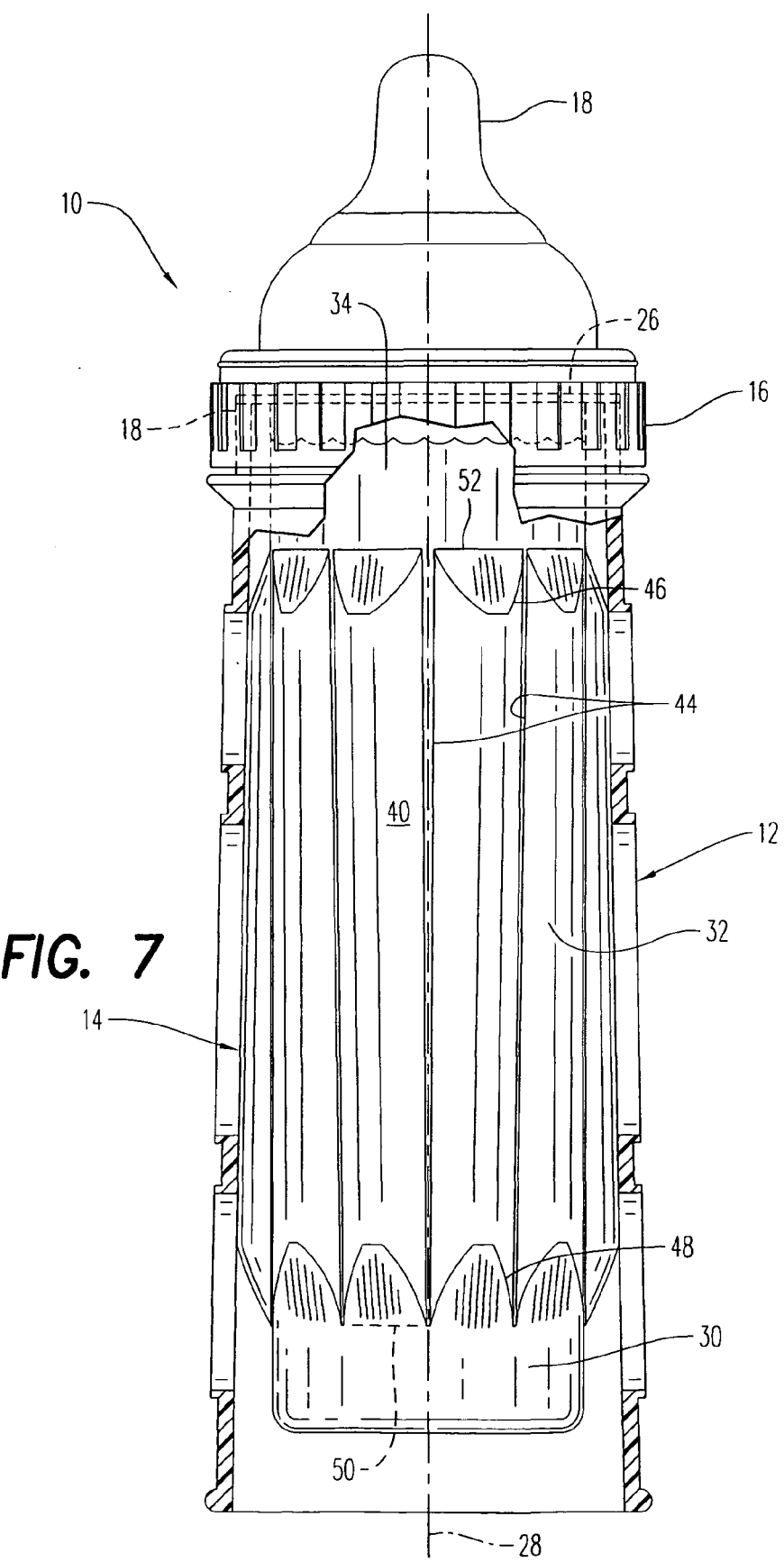
FIG. 7 shows the bottle assembly of FIG. 6, after filling and illustrating the fluted preformed liner in an expanded position.
Figure 8:
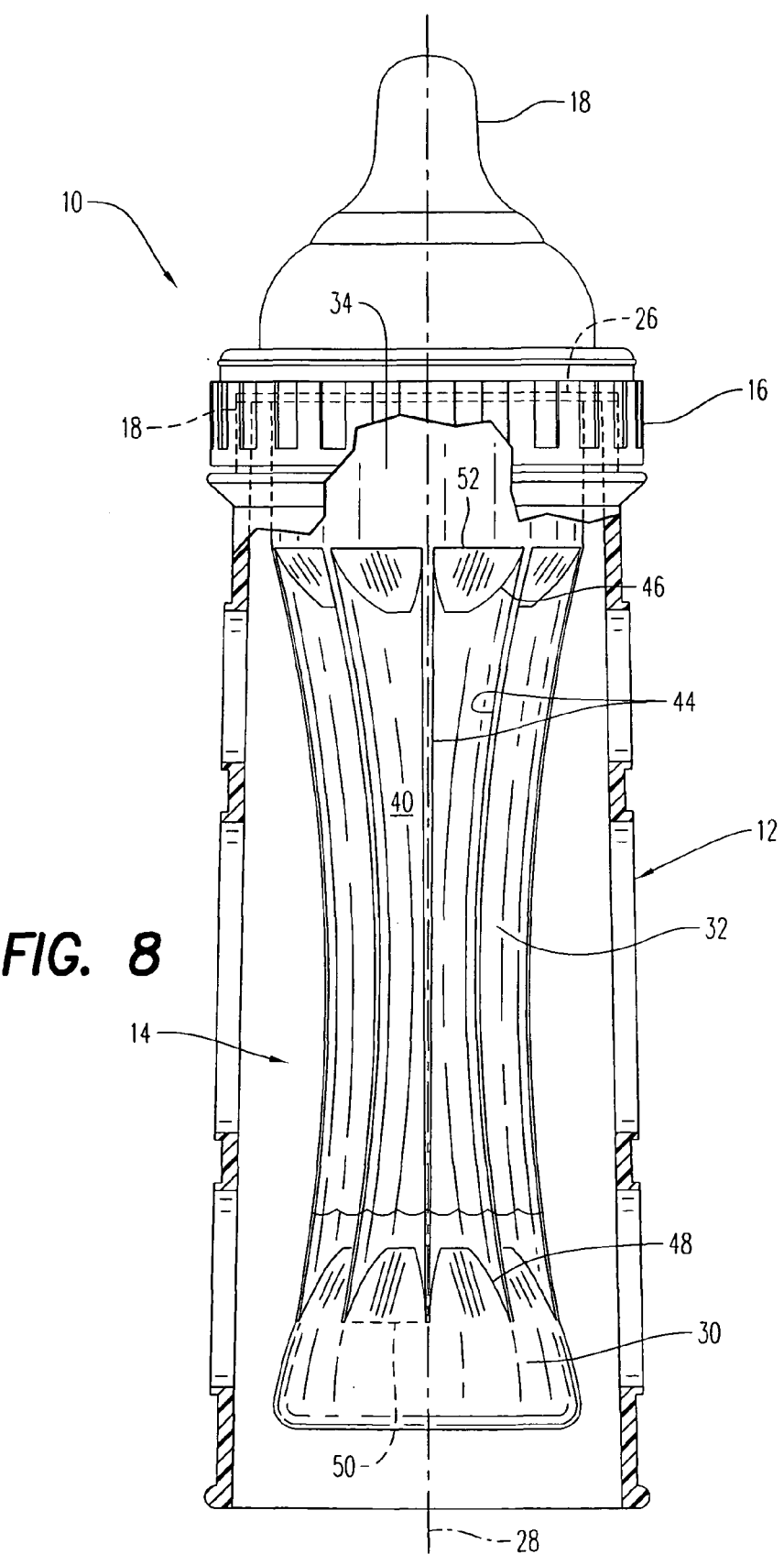
FIG. 8 shows the bottle assembly of FIG. 6, during use and illustrating the fluted preformed liner in a partially collapsed position.

The operation of fluted preformed liner 14 is described with simultaneous reference to FIGS. 6 through 8. Preformed liner 14 is illustrated in FIG. 5 after insertion into holder 14 and before filling the preformed liner with the desired liquid. Preformed liner 14 is illustrated in FIG. 6 after filling the preformed liner with the desired liquid and after assembly of rim 16 and nipple 18 to the holder. Preformed liner 14 is illustrated in FIG. 7 after partially collapsing due to the withdrawal of at least a portion of the liquid. Thus, flutes 40 are configured to move among an unfilled position (FIG. 6), a filled position (FIG. 7), and a collapsed position (FIG. 8).

In its normal or unfilled state, preformed liner 14 can easily be dropped or inserted into holder 12 until rim 26 rests on open top end 18 of the holder as shown in FIG. 6. In the unfilled state, preformed liner 14 has an internal volume of about 6 ounces.

After inserting preformed liner 14 into holder 12, the preformed liner can be filled with any desired liquid. The positive pressure of the liquid in preformed liner 14 is sufficient to flex or invert flutes 40 radially outward (e.g., away from axis 28) to the position shown in FIG. 7. More particularly, each flute 40 can pivot about a first interface line 44 between that flute and its two adjoining divider walls 42. Further, each flute 40 can pivot about a second interface line 46 between that flute and base section 30, as well as a third interface line 48 between that flute and neck section 34. As each flute 40 flexes outward about the second and third interface lines 46, 48, central section 32 rotates about an axis 50, 52 that is perpendicular to central axis 28.

Advantageously, preformed liner 14 expands radially outward until flutes 40 are, in some embodiments, constrained by holder 12. In this manner, preformed liner 14 can be filled to an internal volume that is substantially similar to the maximum internal volume of holder 12.

For example, some of Applicants commercially available holders 12, sold under the tradename Nurser System, have a maximum internal volume of about 10.2 ounces. Several prior art preformed liners, which have previously been available for this size holder 12, when filled with liquid only provide an internal volume of about 8.0 ounces.

In contrast, preformed liner 14 of the present disclosure, when used with the same size holder 12, can be filled to an internal volume of between about 9.0 to about 10.2 ounces, with between about 9.2 to about ounces 9.8 being preferred, and any subranges therebetween.

Thus, flutes 40 allow preformed liner 14 to expand, when filled, to more completely match the maximum internal volume of the holder in which it is used. In some embodiments, preformed liner 14 expands between its unfilled internal volume and its filled internal volume by more than about 110%. In other embodiments, preformed liner 14 expands between its unfilled internal volume and its filled internal volume up to about 170%. In a preferred embodiment, preformed liner 14 expands between about 150% to about 160% from its unfilled internal volume and to its filled internal volume, and any subranges therebetween.

During use, the negative pressure or vacuum which results from removal of the liquid from preformed liner 14 is sufficient to collapse or contract flutes 40 radially inward (e.g., towards axis 28) to the position shown in FIG. 8. More particularly, each flute 40 can pivot about the first, second, and third interface lines 44, 46, 48, as well as about axes 50, 52. In this manner, preformed liner 14 can minimize the amount of air a baby ingests during use.

Accordingly, preformed liner 14 is moveable among three positions, a normal position (FIG. 6), an expanded position (FIG. 7), and a collapsed position (FIG. 8).

Preformed liner 14 is preformed of materials having sufficient flexibility and thickness to allow the preformed liner to expand and collapse in the manner described above. However, preformed liner 14 is made of materials having sufficient rigidity and thickness to allow the preformed liner to stand unsupported on closed bottom end 22 before filing. In some embodiments, preformed liner 14 is made of materials having sufficient rigidity and thickness to allow the preformed liner to stand unsupported once filled.

Any type of flexible material, or combination of materials, may be used to construct preformed liner 14. These materials include, but are not restricted to, low density polyethylene (LDPE), linear low density polyethylene (LLDPE), medium density polyethylene (MDPE), high density polyethylene (HDPE), polypropylene (PP) and ethylene vinyl acetate (EVA). Any of the above materials may be 100% virgin or incorporate any desired amount of regrind of the same or different material. In addition, the preformed liner 14 of the present disclosure may comprise a co-extrusion of film or sheet that combines two or more layers of various resins to form one composite material, such as a material having a layer of LDPE and a layer of HDPE.

A preferred preformed liner 14 is made of polyethylene resin. A more preferred material is a low density polyethylene (LDPE) resin, and a most preferred material is a linear low density polyethylene resin. Such preferred resins include the DOWLEX Linear Low Density Polyethylene Resin by Dow Plastics; PE 5754 High Clarity, High Impact Film Resin by Chevron Chemical; and, Escorene Low Density Polyethylene LD-103 Industrial Film Resin by Exxon Chemicals.

A most preferred preformed liner 14 is made of octene-based linear low density polyethylene and low density polyethylene blended together, which is commercially available from Nova Chemicals.

Rim 26 is, preferably, made of the same flexible material as preformed liner 14. However, rim 26 is preferably thicker and, thus, harder and more rigid, than remaining sections 30, 32, 34 of preformed liner 14. Rim 26 is flexible enough to collapse while dispensing from known dispensing packages. At the same time, rim 26 is rigid enough to support the weight of fluid contained in preformed liner 14 when the preformed liner is mounted in holder 12, so as not to fall through open top end 18 of the holder. Of course, it is contemplated by the present disclosure for rim 26 to be made of different material as the remaining sections of drop in-liner 14.

In other embodiments, preformed liner 14 can, in addition to or in lieu of flutes 40, be made from any type of elastomeric material that allows for the desired expansion. For example, at least central section 32 can be made from any type of elastomeric material that allows for the desired expansion.

For example, it is contemplated by the present disclosure for preformed liner 14 to be made of elastomeric materials that can expand or stretch radially outward (e.g., away from axis 28) in response to the positive pressure on the liner once filled with liquid. The elastomeric materials can expand linearly, non-linearly, elastically, non-elastically, and any combination thereof.

Figure 9:
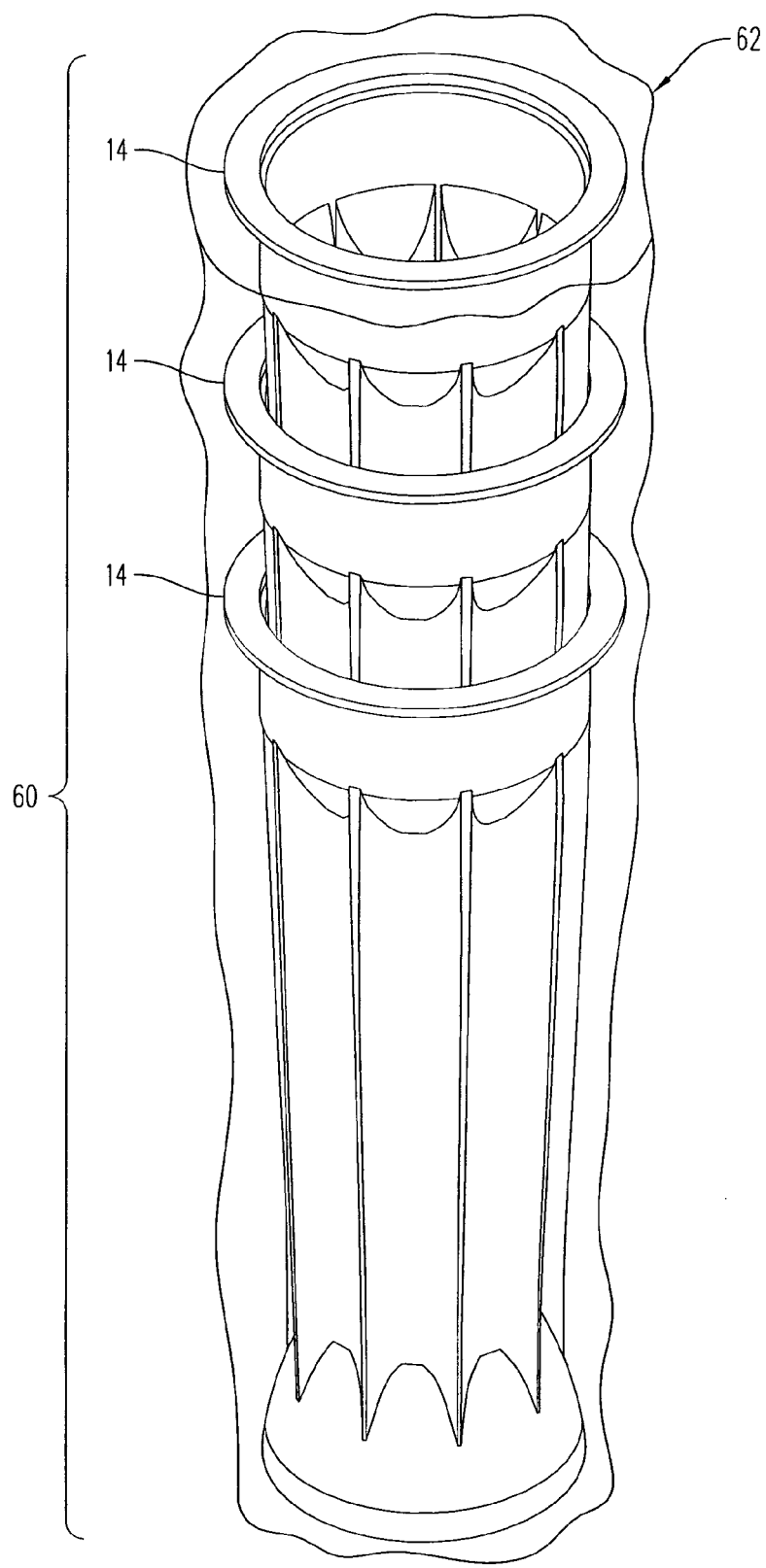
FIG. 9 is a top perspective view of an exemplary embodiment of a kit of fluted preformed liners according to the present disclosure.

Referring now to FIG. 9, preformed liners 14 are configured to be nested or stacked within one another to form a stack or kit 60 of preformed liners. Kit 60 can be wrapped in a package or wrapper 62 for sale. Alternately, kit 60 can be packaged in a dispenser as shown in described in Applicant's own U.S. Pat. No. 6,123,222, the contents of which are incorporated herein by reference. In a preferred embodiment, kit 60 is sterilized within wrapper 62.

During nesting, the closed bottom end 24 of one preformed liner 14 is placed within the open top end 22 of another preformed liner. Further, each preformed liner 14 is radially offset from one another by a predetermined distance so that the divider wall 42 of one preformed liner is offset from the divider wall 42 of the next preformed liner.

Central section 32 has a minimum diameter 64 (FIG. 5) disposed at the interface between base section 30 and the central section. Minimum diameter 64 is smaller than outer diameter 36 of base section 30. Normally, such a configuration would preclude the nesting of multiple preformed liners 14. Advantageously, the same expansion of flutes 40 discussed herein above useful in maximizing the internal volume of preformed liner 14 has been determined by the present disclosure as being useful for nesting multiple preformed liners. Specifically, it has been found that, during a nesting operation, outer diameter 36 of base section 30 applies sufficient force on central section 32 to expand flutes 40 outward so that the base section can pass through the minimum diameter 64 of the central section.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments failing within the scope of the appended claims.

What is claimed is:

1. A preformed liner for holding a liquid for a bottle assembly, the preformed liner comprising:
    a neck section that extends along a longitudinal axis of the liner, said neck section having a cylindrical shape with an axial extent, and an open top end;
    a base section depending from said central section along said longitudinal axis, said base section having a closed bottom end, and
    a central section disposed between said neck section and said base section along the longitudinal axis, wherein said central section comprises a plurality of axially extending flutes wherein said plurality of axially extending flutes do not extend into said neck section.

2. The preformed liner as in claim 1, wherein said central section expands between an unfilled internal volume and a filled internal volume by more than about 110%.

3. The preformed liner as in claim 1, wherein said central section expands between an unfilled internal volume and a filled internal volume up to about 170%.

4. The preformed liner as in claim 1, wherein said central section expands between an unfilled internal volume and a filled internal volume between about 150% to about 160%.

5. The preformed liner as in claim 1, wherein said central section comprises an expandable or stretchable elastomeric material that can stretch radially from said longitudinal axis and collapse radially inward toward said longitudinal axis.

6. The preformed liner as in claim 1, wherein said central section comprises an expandable or stretchable elastomeric material that can stretch radially from said longitudinal axis and collapse radially inward toward said longitudinal axis.

7. A preformed liner for holding a liquid, the preformed liner comprising:
    a neck section having an open top end;
    a central section depending from said neck section along a longitudinal axis; and
    a base section depending from said central section along said longitudinal axis, said base section having a closed bottom end and a generally frusto-conical shape that decreases in diameter from said closed end towards said central section,
    said central section having a plurality of axially extending flutes separated by a plurality of divider walls, said plurality of flutes and divider walls extending along said longitudinal axis, wherein each of said plurality of divider walls intersect said base section at a location of decreased diameter away from said closed end of said base section, said plurality of flutes being expandable radially from said longitudinal axis when the liner is filled with liquid and being collapsible radially inward toward said longitudinal axis when liquid is withdrawn from the liner.

8. The preformed liner as in claim 7, wherein said base section has a generally frusto-conical shape that decreases in diameter from said closed bottom end upwards along said longitudinal axis towards said central section.

9. The preformed liner as in claim 7, wherein said central section has a generally cylindrical shape with a first taper that increases in diameter from said base section upwards along said longitudinal axis towards said neck portion.

10. The preformed liner as in claim 9, wherein said first taper comprises an angle with respect to said longitudinal axis of between about 5 degrees to about 30 degrees.

11. The preformed liner as in claim 7, wherein said closed bottom end has an outer diameter that is less than an inner diameter of said open top end.

12. The preformed liner as in claim 7, wherein each flute of said plurality of flutes comprises a generally semi-circular cross sectional shape.

13. The preformed liner as in claim 7, wherein each flute of said plurality of flutes comprises a cross sectional shape selected from the group consisting of a semi-circle, a polygon, an oval, and any combinations.

14. The preformed liner as in claim 7, wherein said plurality of flutes are uniformly distributed about a circumference of said central section.

15. The preformed liner as in claim 7, wherein said plurality of flutes comprises between about four and about twelve flutes.

16. The preformed liner as in claim 7, wherein said plurality of flutes comprises between about six and about ten flutes.

17. The preformed liner as in claim 7, wherein said plurality of flutes comprises about nine flutes.

18. The preformed liner as in claim 7, wherein said plurality of flutes expand between an unfilled internal volume and a filled internal volume by more than about 110%.

19. The preformed liner as in claim 7, wherein said plurality of flutes expand between an unfilled internal volume and a filled internal volume up to about 170%.

20. The preformed liner as in claim 7, wherein at least said central section comprises an expandable or stretchable elastomeric material that can stretch radially from said longitudinal axis and collapse radially inward toward said longitudinal axis.

21. A bottle assembly comprising:
    a holder having an open top;
    a preformed liner having a neck section having an end with a rim, a base section, and a central section that is disposed between said neck section and said base section, said base section having a closed end and with a generally frusto-conical shape that decreases in diameter from said closed end towards said central section;
    wherein said central section has a plurality of axially extending flutes that extend from a portion of said base section having a decreased diameter to said neck section opposite said rim, said preformed liner being disposed in said holder so that said rim rests on said open top; and
    a retaining rim removably securing a nipple and said rim, in an airtight manner, to said holder over said open top.

22. The bottle assembly as in claim 21, wherein said preformed liner, when in said expanded position, is substantially equal to a maximum internal volume of said holder.

23. The bottle assembly as in claim 21, wherein said plurality of flutes move to a collapsed position with respect to said longitudinal axis.

24. The bottle assembly as in claim 21, wherein at least said central section comprises an expandable or stretchable elastomeric material that can stretch between said normal position and said expanded position.

25. The bottle assembly as in claim 21, wherein at least said central section comprises an expandable or stretchable elastomeric material that can stretch between said normal position and said expanded position.

26. A method of assembling a baby bottle, comprising:
    inserting a preformed liner into an open end of a holder along a longitudinal axis of said preformed liner until a rim of the preformed liner rests on said open end, wherein said preformed liner comprises a neck section having a cylindrical shape, a base section and a plurality of flutes disposed along said longitudinal axis and between said neck section and said base section and wherein said plurality of flutes taper from said neck section towards said base section; and filling said preformed liner with liquid until said plurality of flutes expand radially outward from said longitudinal axis such that said preformed liner contacts an inside of said holder.

27. The method as in claim 26, wherein said preformed liner comprises an expandable or stretchable elastomeric material and wherein said filling step comprises filling said preformed liner with liquid until said elastomeric material stretches so as to contact an inside of said holder.

28. The method as in claim 26, wherein said preformed liner comprises an expandable or stretchable elastomeric material and wherein said filling step comprises filling said preformed liner with liquid until said elastomeric material stretches so as to contact an inside of said holder.

29. The method as in claim 26, further comprising attaching a nipple to said open end in an airtight manner.

30. A preformed liner as in claim 1, wherein said plurality of axially extending flutes are formed along the entire longitudinal axis of said liner, from said neck section to said base section.

* * * * *